ALTERNATING CURRENTS PHASE AND FREQUENCY COMPARATOR BRIDGE USING DIODE AMPLIFICATION EFFECT

Filed June 8, 1960

INVENTOR.
RAYMOND L. MIDKIFF.
BY Alden D. Redfield
Irwin P. Garfinkle
ATTORNEYS.

United States Patent Office 3,139,533

Patented June 30, 1964

3,139,533
ALTERNATING CURRENTS PHASE AND FREQUENCY COMPARATOR BRIDGE USING DIODE AMPLIFICATION EFFECT

Raymond L. Midkiff, Hamilton, Ohio, assignor to Avco Corporation, Cincinnati, Ohio, a corporation of Delaware Filed June 8, 1960, Ser. No. 34,765
4 Claims. (Cl. 307—88.5)

This invention relates broadly to modulators and detectors of the balanced type and, more particularly, to high impedance bridge networks incorporating active impedance transformation, diode retification, and diode amplification.

One of the problems encountered with active amplifiers of the tube and transistor type is the impedance matching into and out of semiconductor bridge type balanced modulators, it being necessary frequently to use high transformation ratios which result in large insertion losses. By means of this invention I provide a high impedance bridge type modulator, thereby eliminating the need for high impedance transformation and, in addition, I not only reduce insertion losses, but I actually produce power amplification in the order of 5 to 6 db. The effective gain of 10 to 12 db which results from the reduction of insertion losses and the addition of amplification is achieved with an actual reduction in cost of the components, compared with those commonly used in balanced type modulators.

Briefly described, the phase-sensitive system of this invention utilizes a plurality of impedance elements connected in a bridge, one source of alternating currents being connected across one diagonal of the bridge and a second source of alternating currents being connected across the other diagonal of the bridge. The impedance elements include at least two semiconductor diodes poled to establish a first conduction path for currents of one polarity and a second conduction path for currents of the opposite polarity, and also include a first resistor connected in the first path and a second resistor connected in the second path. A condenser is connected across one of the resistors to establish a running back-bias on each of the semiconductor diodes. This arrangement has the effect of increasing the impedance of the phase-sensitive system and of amplifying the signal produced at the output of the bridge by means of diode amplification occurring in the diodes.

It is, therefore, the primary object of this invention to produce an improved modulator, detector, or phase-sensitive circuit of the balanced bridge type.

Another object of this invention is the provision of a high impedance bridge type, phase-sensitive circuit which may be coupled directly to the driving and driven members in a system without undue impedance transformation.

Other objects of this invention are to produce circuitry which is relatively non-critical to component tolerances, to reduce initial and operating costs, and to provide a modulator, detector, or other phase-sensitive circuit with high reliability.

Further objects and a more complete understanding of this invention may be obtained by reference to the following detailed specification and to the accompanying drawings, in which.

The prior art, as exemplified by United States Patent No. 2,510,075 issued to Andre G. Clavier et al., teaches the use of balanced diode type detectors and, as pointed out therein, diode bridges of this type may be used as modulators or demodulators. In addition, it is known that the arrangement may also be used as a phase-sensitive circuit for many other purposes.

In the prior art circuit, it will be noted that four unidirectional elements are connected in a two-diagonal bridge with a high frequency source connected across each of the diagonals. When the prior art circuit is used for detecting a difference in phase or frequency between two sources, several problems are encountered. First, the prior art bridge has a relatively low operating impedance which necessitates impedance-matching devices to permit the use of a high impedance driver. Therefore, when power is a major factor, the prior art circuit is inadequate because of the insertion losses resulting from the impedance-matching devices. Moreover, to obtain the necessary power from a low impedance device will require one or more stages of amplification.

As actually reduced to practice, the bridge circuit described and claimed herein was used as a phase detector for comparing the phase and frequency relationship of two high frequency sources. The object of the devices was to provide an output voltage or error signal proportional to a phase and/or frequency difference between the sources, the error signal then being used in a servo loop to control one of the sources and thus eliminate the error. The servo system in which this device was used is described in patent application of Frank M. Brauer, Serial No. 771,363, entitled "An Electronic Servo System for Frequency Control," filed November 3, 1958, now Patent No. 2,958,768, issued November 3, 1960.

Figure 1:
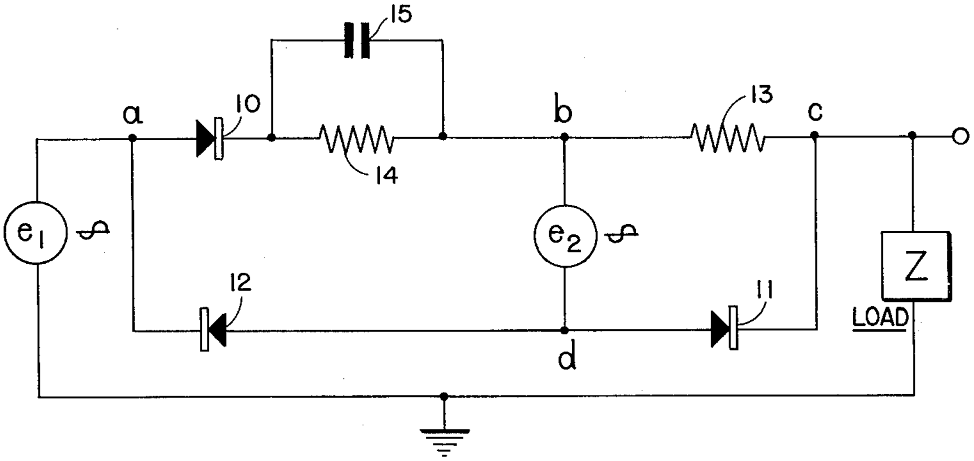
FIG. 1 is a schematic representation of a preferred form of this invention.

By means of the apparatus shown in FIG. 1, I am able to improve the prior art balanced diode bridge by increasing the impedance of the bridge without introducing insertion losses and by eliminating the requirement for impedance transformation. In addition, I operate the diodes as amplifiers to produce a sizeable power gain in the output. The balanced diode bridge illustrated in FIG. 1 includes the usual four terminals *a*, *b*, *c*, and *d*, the diodes 10, 11, and 12 being connected in legs *a–b*, *c–d*, and *a–d*, respectively. In lieu of a diode in the leg *b–c*, I provide a large resistor 13 and, in series with the diode 10 in the leg *a–b*, I provide a similar resistor 14 across which a condenser 15 is connected. As in the usual bridge detector, I connect a first source $e_1$ in series with a load Z across one of the diagonals *a–c*, and the second source $e_2$ across the other diagonal *b–d*.

In the embodiment illustrated, the sources $e_1$ and $e_2$ are high frequencies of essentially the same amplitude. Note that the diodes 10 and 11 are poled for low conductivity in the same direction, while the diode 12 is poled for low conductivity in the opposite direction. Also note that a diode poled for low conductivity in the same direction as diode 12 may be connected in series with the resistor 13 in the leg *b–c*, but, as will be seen, is not required where the resistance value of the resistor 13 is sufficiently high.

Ignoring for the moment the effect of the condenser 15 connected across resistor 14 in the leg *a–b*, it will be seen that if the sources $e_1$ and $e_2$ are operating at different frequencies, the phase relationships at the various diodes will continuously change or rotate, thereby alternately causing conduction via two conducting paths through the various diodes and producing a sinusoidal output at the difference or beat frequency across the load Z. The magnitude of the output will be a function of the frequency difference.

If the sources $e_1$ and $e_2$ have equal amplitudes then, when operating in phase, there will be no voltage difference between the electrodes of any of the diodes, and no conduction through the load Z results.

When sources $e_1$ and $e_2$ are operating at the same rate but out of phase, i.e., one source is leading or lagging the other, a pulsating voltage output having a magnitude proportional to the amount of phase difference and a polarity corresponding to the direction of phase difference results.

Under these circumstances, there will be conduction through only one of two paths, depending on which source leads. Thus, conduction results from source $e_1$ through diode 10, resistor 14, condenser 15, source $e_2$, diode 11, and load Z in one direction or, in the opposite direction, from source $e_1$ through load Z, resistor 13, source $e_2$, and diode 12.

Note that both conducting paths include a high impedance, namely, the resistors 13 and 14, respectively, and this has the advantage of increasing the impedance of the detector, thereby eliminating the need for impedance transformation devices. However, without the use of the additional teachings of this invention, the insertion of the large resistors 13 and 14 will produce intolerable power losses. By connecting the condenser 15 across resistor 14, these power losses are not only reduced but, as compared with the prior art circuits, a net power gain of 10 to 12 db results. This is accomplished by means of diode amplification produced in each of the diodes 10, 11, and 12.

The diode amplification phenomenon will be best understood by reference to United States Patent No. 2,666,816 issued to Lloyd P. Hunter, which teaches the effect of the combination of a direct current and a high frequency bias on a diode. Hunter shows that when a diode is back-biased with direct current in series with a relatively high frequency bias source, a signal of relatively low frequency will be power-amplified in the output of the diode. I use this principle of diode amplification in a unique manner to produce unique results in a phase-sensitive circuit.

Referring again to the drawing, considering the internal impedance of the source $e_2$ to be negligible, it will be noted that one plate of the condenser 15 is connected to a terminal of each of the diodes. In operation, the currents from the sources $e_1$ and $e_2$ produce a running charge on the condenser 15 so as to produce a running back-bias on each of the diodes. Unlike Hunter, who uses a fixed battery bias, the bias resulting from the running charge on condenser 15 is directly proportional to the phase or frequency relationship between the sources and, therefore, there is increased power amplification for increased phase error, due to an increase in the running D.-C. bias. The high frequency bias results from the application of the high frequencies from the sources $e_1$ and $e_2$, or from high order harmonics of the difference or beat frequencies, or both, and the power of the alternating current bias drive is also a function of the phase or frequency difference. Therefore, the gain of the system increases as a result of the increased power of the high frequency drive. The relatively lower frequency signal which is amplified in the output is the difference frequency error signal. Furthermore, rather than producing a power loss, the resistors 13 and 14 serve as the required loads for the diodes and, as taught by Hunter, this is necessary to produce amplification.

The values of resistors 13 and 14 are made essentially equal and are of an order of magnitude higher than the normal impedance of a conventional balanced bridge detector of this type. The condenser 15 which, in effect, is a supermodulation energy reservoir, need be only large enough to supply energy for the supermodulation drive. The action of the condenser 15 may better be understood if it is recognized that the two signal sources heterodyne to provide a high frequency bias voltage which is used in conjunction with the other circuit parameters to initiate and maintain diode switching.

The switching frequency is a function of the phase difference in the two sources and, hence, diode amplifier gain is related to the switching rate such that the sensitivity of the sensor is effectively magnified. The R-C parameters are selected of suitable values to accommodate the integrating action which supports diode switching and, because a running bias is properly established at all three diodes, amplifying action is produced at each. Analyzed another way, the novel arrangement of diodes, resistors, and capacitor constitutes a negative resistance type oscillator such that a switching potential, i.e., a high frequency low order oscillation may be sustained automatically, once it is started by the source energy.

From the static point of view, all the diodes in the network will be backed-biased. Were there no systematic triggering of the diode, this system would function according to grid-leak detector theory. On the other hand, when an oscillating voltage is applied to key the diode in such a way that short duration or instantaneous currents can flow in the normal, non-conducting direction through the diode as the diode is driven through its zero bias point, the current voltage characteristic assumes the general shape represented in FIG. 2. That is to say, the portion near the zero bias point appears to execute a reversal of slope which may be interpreted as negative resistance when operated in conjunction with low impedance source drive. This characteristic of the semiconductor is well known to the prior art, and it is used in this arrangement for advantageously providing both impedance transformation and power amplification in a simple bridge network.

For a better understanding of the characteristic of the diode at or near the zero bias point, reference may be made to Bulletin 59–V, dated February, 1959, issued by Microwave Associates, Inc., entitled "Varactors." In the embodiment of this invention which was reduced to practice, silicon diodes with relatively high frequency characteristics were used, but diodes of germanium and other materials are also appropriate for other applications; and almost any semiconductor diode commercially available will produce the required result. The particular embodiment reduced to practice provides input and output impedance in the order of 30,000 to 50,000 ohms with a power gain of approximately 6 db. The diodes used were IN928. Capacitor 15 was 30 $\mu\mu$f., and resistors $R_1$ and $R_2$ were 82,000 ohms each. The frequency of drive was centered at 11.5 mc. It was found that the resistor tolerances may be $\pm 30\%$, and the capacitor value may be fixed within a range of from 15 to 40 $\mu\mu$f.

Figures 2, 3:
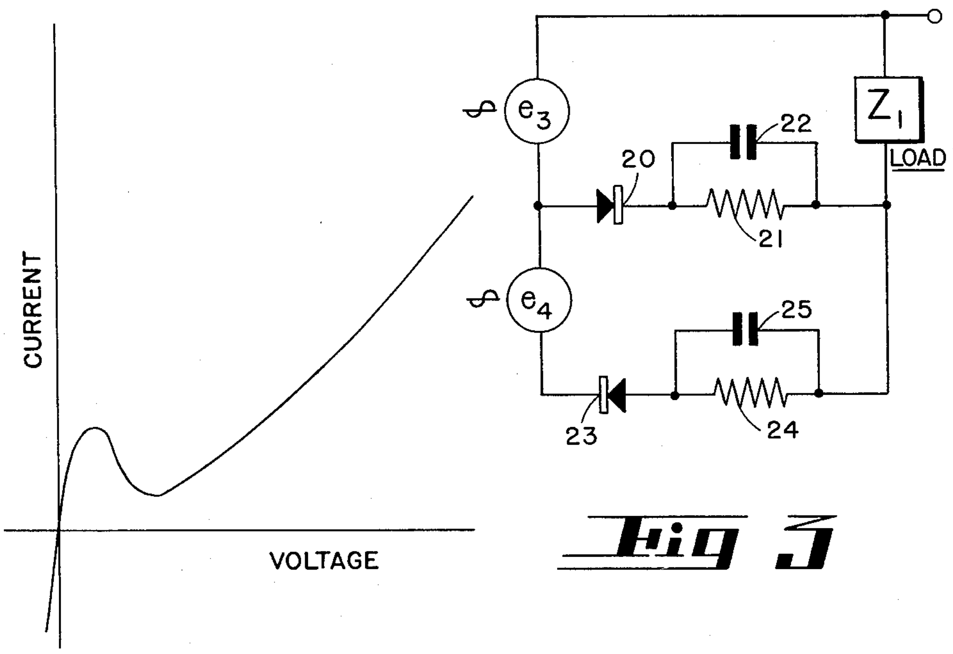
FIG. 2 is a curve showing the characteristics of a conventional diode.
FIG. 3 is a schematic representation of a modification of this invention.

In the embodiment of this invention illustrated in FIG. 3, I am able to accomplish essentially the same phase detection with diode amplification and impedance transformation while using only two diodes. Thus, in FIG. 3 the sources $e_3$ and $e_4$ are connected to the load $Z_1$ through two diode paths. The first path is established by means of the diode 20 poled in one direction connected in series with the parallel-connected resistor 21 and condenser 22. The second path is established by means of the oppositely poled diode 23 connected in series with the parallel-connected resistor 24 and condenser 25. The result of this arrangement is to produce diode switching in the same manner as described in connection with FIG. 1, thereby producing the necessary running bias for effecting diode amplification. In addition, because of the insertion of the high impedances, an impedance match between the sources and the load is achieved.

While the systems illustrated describe relatively simple and sensitive frequency or phase detectors, it is clear that the same circuitry is also applicable to modulators, mixers and error sensors in a broad sense, and the concepts taught should find ready application in many electronic systems. For these reasons it is my intention that this invention be limited only by the appended claims as read in the light of the prior art.

What is claimed is:

1. In a phase-sensitive system the combination comprising: a plurality of impedance elements connected in a series loop to form a two-diagonal bridge; a first source of alternating currents connected across one diagonal of said bridge; a second source of alternating currents connected across the other diagonal of said bridge; a load connected in one diagonal of said bridge; said impedance elements including a plurality of semiconductor diodes poled to establish a first conduction path for currents of one polarity and a second conduction path for currents of the opposite polarity; a first resistor in said first path and a second resistor in said second path; and means for establishing a running back bias on each of said semiconductor diodes, said means comprising a condenser connected across one of said resistors whereby the impedance of said phase-sensitive system is increased by said resistors and whereby an amplified signal is produced across said load.

2. In a phase-sensitive detector-amplifier circuit the combination comprising: first and second high frequency sources; a load; first, second, third, and fourth impedance branches connected in a series loop to form a four-terminal, two-diagonal bridge; means connecting said first source across one of the diagonals of said bridge; means connecting said second source in series with said load across the other diagonal of said bridge; said first, second, and third branches including a semiconductor diode and said fourth branch including a first resistor; a second resistor connected in series with a diode in another of said branches, said diodes being poled to establish a first conducting path for currents of one polarity through said first resistor and said load and a second conducting path for currents of the opposite polarity through said second resistor and said load; and a condenser connected across one of said resistors for producing a running direct voltage back bias on each of said diodes, whereby an amplified output is produced across said load and the impedance of said detector-amplifier is increased.

3. In a phase-sensitive system, the combination comprising:

first and second sources of alternating currents;

a load;

means for producing at said load an amplified beat frequency of said first and second sources, said means comprising first and second oppositely poled impedance paths from said sources through said load, each of said impedance paths including at least one semiconductor diode junction and a high resistive impedance; and means for establishing a running back-bias on said diode junctions, said back-bias being proportional to the frequency difference between said first and second sources, said last-named means comprising at least one capacitor connected across one of said high resistive impedances.

4. In a phase-sensitive system, the combination comprising:

first and second sources of alternating currents;

a load;

first, second, third, and fourth impedance branches connected in a series loop to form a four-terminal bridge, said first, second, and third branches each including a semiconductor diode junction, and said fourth branch including a resistor;

a second resistor connected in series with one of said first, second, or third branches;

connections from said first and second sources to said load through said bridge;

said diode junctions being poled to establish a first conducting path for currents of one polarity through said first resistor and said load, and a second conducting path for currents of the opposite polarity through said second resistor and said load; and a condenser connected across one of said resistors for producing a running direct voltage back-bias on each of said diode junctions whereby an amplified output is produced across said load.

References Cited in the file of this patent

UNITED STATES PATENTS

| | | |
|---|---|---|
| 2,640,939 | Staschover et al. | June 2, 1953 |
| 2,856,522 | Bachmann | Oct. 14, 1958 |
| 2,997,659 | Abbott et al. | Aug. 22, 1961 |
| 3,023,357 | Hierholzer et al. | Feb. 27, 1962 |